(12) United States Patent
Cherkasova et al.

(10) Patent No.: US 7,117,242 B2
(45) Date of Patent: Oct. 3, 2006

(54) SYSTEM AND METHOD FOR WORKLOAD-AWARE REQUEST DISTRIBUTION IN CLUSTER-BASED NETWORK SERVERS

(75) Inventors: Ludmila Cherkasova, Sunnyvale, CA (US); Magnus Karlsson, Mtn. View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 920 days.

(21) Appl. No.: 09/886,672

(22) Filed: Jun. 20, 2001

(65) Prior Publication Data

US 2003/0028636 A1 Feb. 6, 2003

(51) Int. Cl.
  G06F 15/16 (2006.01)
  G06F 15/167 (2006.01)
  G06F 15/173 (2006.01)
  G06F 12/00 (2006.01)

(52) U.S. Cl. ...................... 709/203; 709/214; 709/215; 709/238; 707/200

(58) Field of Classification Search ................ 709/203, 709/214–215, 238; 707/200, 201, 202, 203, 707/204, 205
See application file for complete search history.

(56) References Cited

U.S. PATENT DOCUMENTS 5,774,660 A * 6/1998 Brendel et al. ............. 709/201
6,330,606 B1 * 12/2001 Logue et al. ............... 709/226
6,438,652 B1 * 8/2002 Jordan et al. ............... 711/120
2002/0188753 A1 * 12/2002 Tang et al. .................. 709/237

* cited by examiner

*Primary Examiner*—John Follansbee
*Assistant Examiner*—Joshua Joo
(74) *Attorney, Agent, or Firm*—Richard P. Lange

(57) ABSTRACT

A method and system for workload-aware request in cluster-based network servers. The present invention provides a web server cluster having a plurality of nodes wherein each node comprises a distributor component, a dispatcher component and a server component. In another embodiment, the present provides a method for managing request distribution to a set of files stored on a web server cluster. A request for a file is received at a first node of a plurality of nodes, each node comprising a distributor component, a dispatcher component and a server component. If the request is for a core file, the request is processed at the first node (e.g., processed locally). If the request is for a partitioned file, it is determined whether the request is assigned to be processed locally at the first node or at another node (e.g., processed remotely). If the request is for neither a core file nor a partitioned file, the request is processed at the first node. In one embodiment, the present invention provides a method for identifying a set of frequently accessed files on a server cluster comprising a number of nodes. Embodiments of the present invention operate to maximize the number of requests served from the total cluster memory of a web server cluster and to minimize the forwarding overhead and disk access overhead by identifying the subset of core files to be processed at any node and by identifying the subset of partitioned files to be processed by different nodes in the cluster.

18 Claims, 9 Drawing Sheets

SYSTEM AND METHOD FOR WORKLOAD-AWARE REQUEST DISTRIBUTION IN CLUSTER-BASED NETWORK SERVERS

FIELD OF INVENTION

The present invention relates to the field of web servers. Specifically, the present invention relates to a method for workload-aware request distribution in cluster-based network servers.

BACKGROUND OF THE INVENTION

Web server clusters are a popular hardware platform in a web hosting infrastructure. Servers based on clusters of workstations are used to meet the growing traffic demands imposed by the World Wide Web. A cluster of servers, arranged to act as a single unit, provides an incremental scalability as it has the ability to grow gradually with demand. However, for clusters to be able to achieve the scalable performance with the cluster size increase, mechanisms and policies are employed for "balanced" request distribution.

Traditional load balancing solutions are represented by two major groups: 1) Domain Name System (DNS) based approaches; and 2) Internet Protocol (IP)/Transmission Control Protocol (TCP)/Hypertext Transfer Protocol (HTTP) redirection based approaches.

In a DNS based approach, the DNS server returns the IP address list (e.g., a list of nodes in a cluster which can serve this content, placing a different address first in the list for each successive request) to distribute the requests among the nodes in the cluster. Thus, different clients are mapped to different server nodes in the cluster. DNS based approaches are widely used, as they require minimal setup time and provide reasonable load balancing. Further, it uses the existing DNS infrastructure (e.g., there is no additional cost). However, DNS based approaches do not recognize either the load of the nodes in a cluster or the content of the request.

The second group, IP/TCP/HTTP redirection based approaches, employ a specialized front-end node, the load-balancer, which acts as a single point of contact for the clients and distributes the requests among back-end server nodes in the cluster. These solutions can be classified in the following groups:

layer four switching with layer two packet forwarding (L4/2);

layer four switching with layer three packet forwarding (L4/3);

layer seven switching (L7) or content aware switching.

These terms refer to the techniques by which the systems in the cluster are configured together. In a L4/2 and L4/3 cluster, the load-balancer determines the least loaded server (this decision is the job of the proprietary algorithms implemented in different products) to which server in a cluster the packet has to be sent.

Traditional load balancing solutions for a web server cluster (L4/2 and L4/3) try to distribute the requests among all the back-end machines based on some load information.

The load-balancer can be either a switch or a load-balancing server (e.g., hardware solution) or a software load balancer (e.g., software solution). In both solutions, the load-balancer determines the least loaded server in a cluster to which the packet should be sent.

Load-balancing servers operate by intelligently distributing the incoming requests across multiple web servers. They determine where to send an incoming request, taking into account the processing capacity of attached servers, monitoring the responses in real time and shifting the load onto servers that can best handle the traffic. Load-balancing servers are typically positioned between a router (connected to the Internet) and a local area network (LAN) switch which fans traffic to the Web servers.

FIG. 1A illustrates a block diagram of a typical configuration of a network with a load-balancing server in accordance with the prior art. Client 110 issues a request which is received at load-balancing server 120, located at the front end. Load-balancing server 120 determines which back-end web server (e.g., web servers 130*a* and 130*b*) gets the request. The decision is based on a number of factors including: the number of servers available, the resources (CPU speed and memory) of each, and how many active TCP sessions are being serviced. All traffic is routed through load-balancing server 120.

FIG. 1B illustrates a block diagram of a typical configuration of a network with a software load-balancer in accordance with the prior art. Client 160 issues a request which is received at server 170 located at the front end, wherein server 170 has stored upon it load-balancing software. The load-balancing software determines which back-end web server (e.g., web servers 180*a* and 180*b*) gets the request. The decision is based on a number of factors including the number of servers available, the resources (CPU speed and memory) of each, and how many active TCP sessions are being serviced. Once a connection has been established with a particular web server, the web server (e.g., web servers 180*a* and 180*b*) responds directly to client 160.

Traditional load balancing solutions for a web server try to distribute the requests evenly among all the back-end machines based on some load information. This adversely affects efficient memory usage because the content is redundantly replicated across the caches of all the web servers, thus resulting in a significant decrease in overall system performance.

Content-aware request distribution (e.g., L7 switching) takes into account the content (can be a Uniform Resource Locator (URL) name, URL type, or cookies) when making a decision to which back-end server the request has to be routed. Content-aware request distribution mechanisms enable intelligent routing inside the cluster to support additional quality of service requirements for different types of content and to improve overall cluster performance. Policies distributing the requests based on cache affinity lead to significant performance improvements compared to the strategies taking into account only load information.

There are three main components comprising a cluster configuration with content aware request distribution strategy: the dispatcher which implements the request distribution strategy, it decides which web server will be processing a given request; the distributor which interfaces the client and implements the mechanism that distributes the client requests to a specific web server; and the web server which processes HTTP requests.

In the content-aware request distribution approach, the cluster nodes are partitioned in two sets: front end and back ends. The front end acts as a smart router or a switch, its functionality is similar to the aforementioned load-balancing software servers. The front end node implements the policy which routes the incoming requests to an appropriate node (e.g., web server) in the cluster. Content-aware request distribution can take into account both document locality and current load. In this configuration, the typical bottleneck is due to front-end node that combines the functions of distributor and dispatcher.

To be able to distribute the requests on a base of requested content, the distributor component should implement either a form of TCP handoff or the splicing mechanism. Splicing is an optimization of the front-end relaying approach, with the traffic flow represented in FIG. 1A. The TCP handoff mechanism was introduced to enable the forwarding of back-end responses directly to the clients without passing through the front-end, with traffic flow represented in FIG. 1B. This difference in the response flow route allows substantially higher scalability of the TCP handoff mechanism than TCP splicing. In considering different cluster designs for content aware balancing strategies, it is assumed that a distributor component implements some form of TCP handoff mechanism.

FIG. 2A shows a typical cluster configuration 200 with content-aware request distribution strategy and a single front-end 210. In this configuration, the typical bottleneck is due to the front-end node 210 that combines the functions of a distributor 220 and a dispatcher 230. Back-end 240 comprises servers 245a, 245b, and 245c.

Thus, another recent solution is shown in FIG. 2B. It is based on alternative distributed cluster design 250 where the distributor components 260a, 260b, and 260c are co-located with the server components 270a, 270b, and 270c, while the dispatcher component 280 is centralized.

In this architecture the distributor is decoupled from the request distribution strategy defined by the centralized dispatcher module. The switch in front of the cluster can be a simple LAN switch or L4 level load-balancer. For simplicity, we assume that the clients directly contact distributor, for instance via RR-DNS. In this case, the typical client request is processed in the following way. 1) Client web browser uses TCP/IP protocol to connect to the chosen distributor; 2) the distributor component accepts the connection and parses the request; 3) the distributor contacts the dispatcher for the assignment of the request to a server; 4) the distributor hands off the connection using TCP handoff protocol to the server chosen by the dispatcher (since in this design the centralized dispatcher is the most likely bottleneck, the dispatcher module resides on a separate node in a typical configuration, as shown in FIG. 2b); 5) the server takes over the connection using the TCP hand-off protocol; 6) the server application at the server node accepts the created connection; and 7) the server sends the response directly to the client.

This design shows good scalability properties when distributing requests with the earlier proposed LARD policy. The main idea behind LARD is to logically partition the documents among the cluster nodes, aiming to optimize the usage of the overall cluster RAM. Thus, the requests to the same document will be served by the same cluster node that will most likely have the file in RAM. Clearly, the proposed distributed architecture eliminates the front-end distributor bottleneck, and improves cluster scalability and performance.

However, under the described policy in a sixteen-node cluster, each node statistically will serve only 1/16 of the incoming requests locally and will forward 15/16 of the requests to the other nodes using the TCP handoff mechanism. TCP handoff is an expensive operation. Besides, the cost of the TCP handoff mechanism can vary depending on the implementation and specifics of the underlying hardware. It could lead to significant forwarding overhead, decreasing the potential performance benefits of the proposed solution.

Web server performance greatly depends on efficient RAM usage. A web server operates much faster when it accesses files from a cache in the RAM. Additionally, the web servers throughput is much higher too.

Accordingly, a need exists for a request distribution strategy that maximizes the number of requests served from the total cluster memory by partitioning files to be served by different servers. A need also exists for a request distribution strategy that minimizes the forwarding and the disk access overhead. Furthermore, a need also exists for a request distribution strategy that accomplishes the above needs and that improves web server cluster throughput.

SUMMARY OF THE INVENTION

The present invention provides a content-aware request distribution strategy that maximizes the number of requests served from the total cluster memory by logically partitioning files to be served by different servers. The present invention also provides a request distribution strategy that minimizes the forwarding and the disk access overhead by assigning a small set of most frequent files (referred to as the core files) to be served by any node in the cluster.

A method and system for workload-aware request distribution in cluster-based network servers are described. The present invention provides a web server cluster having a plurality of nodes wherein each node comprises a distributor component, a dispatcher component and a server component. The distributor component operates to distribute a request to a specific node. The dispatcher component has stored upon it routing information for the plurality of nodes which is replicated across the plurality of nodes. The routing information indicates which node is assigned for processing a request. The server component operates to process the request. In one embodiment, the plurality of nodes are coupled to a network.

In another embodiment, the present invention provides a method for managing request distribution of a set of files stored on a web server cluster. A request for a file is received at a first node of a plurality of nodes, each node comprising a distributor component, a dispatcher component and a server component. If the request is for a core file, the request is processed at the first node. If the request is for a partitioned file, it is determined whether the request is assigned to be processed by the first node (e.g., processed locally). If the request for a partitioned files is assigned to be processed by the first node, the request is processed at the first node. If the request for a partitioned file is assigned to be processed by another node, the request is forwarded to the correct node for processing (e.g., processed remotely). If the request is not for a core file or a partitioned file, the request is processed at the first node.

In one embodiment, the web server cluster also comprises a set of base files, wherein the base files are a set of frequently accessed files fitting into a cluster memory (RAM) of the web server cluster.

In one embodiment, the present invention provides a method for identifying a set of frequently accessed files on a server cluster comprising a number of nodes. A set of base files is defined wherein the base files are a set of frequently accessed files fitting into the cluster memory of the server cluster. The base files are ordered by decreasing frequency of access. The base files are logically partitioned into a subset of core files having a core size, a subset of partitioned files having a partitioned size, and a subset of on disk files which are evicted from the cluster memory (RAM) to a disk. Each subset of files is ordered by decreasing frequency of access, respectively. The core files and partitioned files are identified wherein the total of the partitioned size added to the product of the number of nodes multiplied by the core size is less than or equal to the cluster memory (RAM). The total overhead due to the base files is minimized wherein the total overhead equals the overhead of the core files plus the overhead of the partitioned files plus the overhead of the on disk files.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

In the following detailed description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing", "determining", "storing", "receiving", "requesting" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Portions of the present invention are comprised of computer-readable and computer executable instructions which reside, for example, in computer-usable media of a computer system. It is appreciated that the present invention can operate within a number of different computer systems including general purpose computer systems, embedded computer systems, and stand alone computer systems specially adapted for controlling automatic test equipment.

Figure 1A:
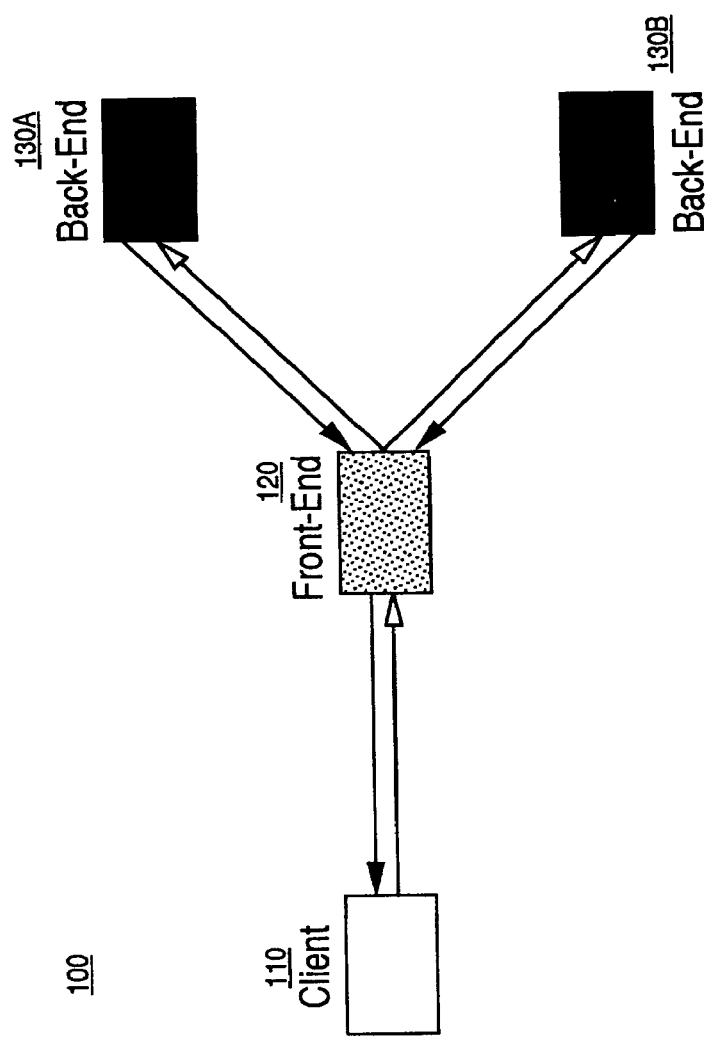
FIG. 1A illustrates a block diagram of a typical configuration of a network with a load-balancing server in accordance with the prior art.
Figure 1B:
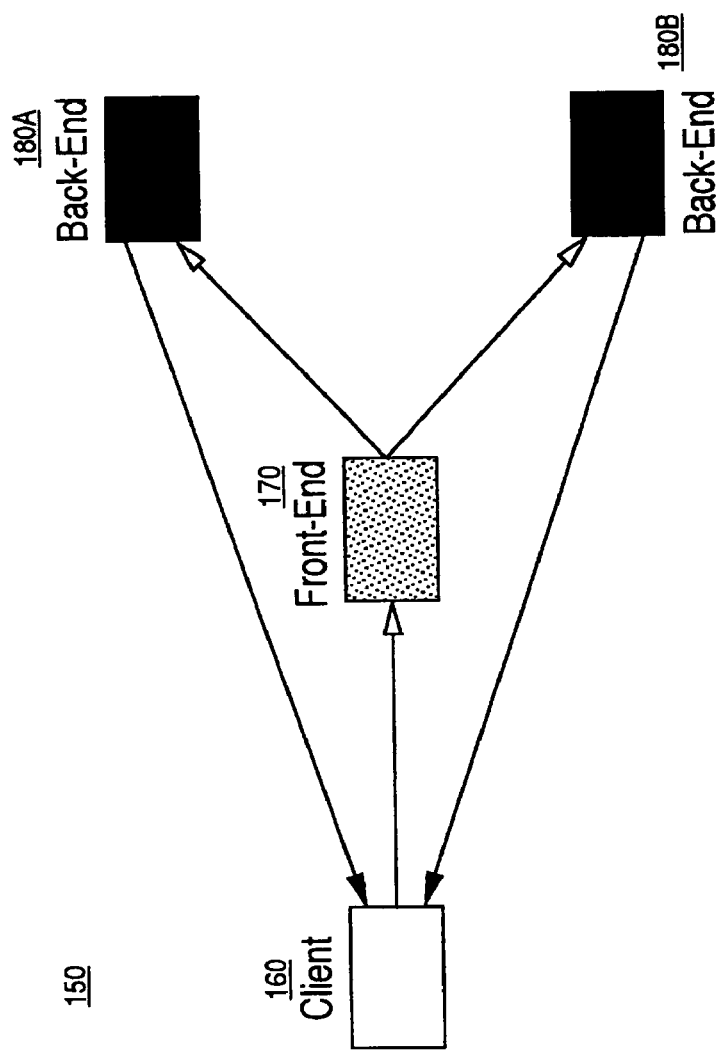
FIG. 1B illustrates a block diagram of a typical configuration of a network with a software load-balancer in accordance with the prior art.
Figure 2A:
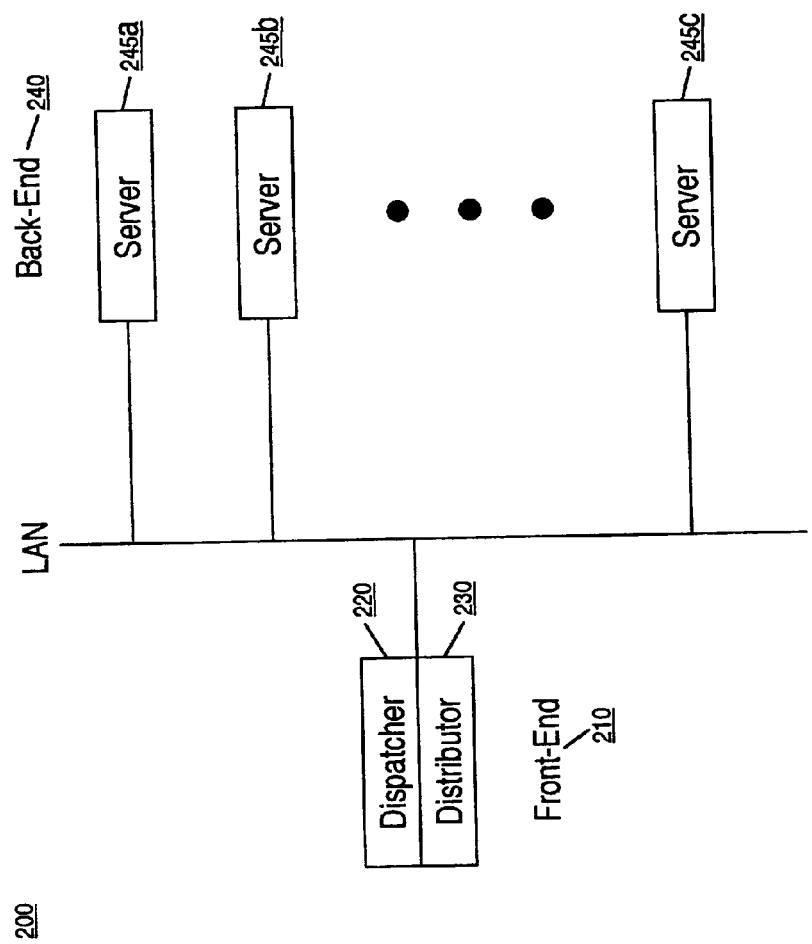
FIG. 2A illustrates a block diagram of a typical cluster configuration with content-aware request distribution strategy with a single front-end in accordance with the prior art.
Figure 2B:
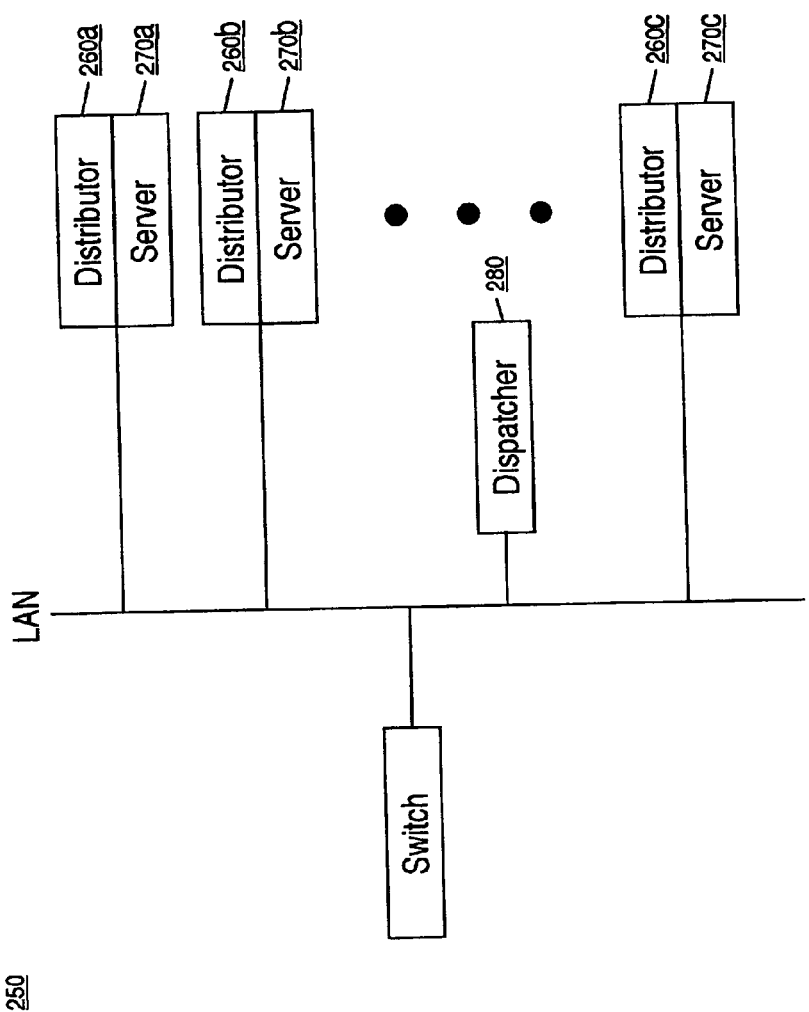
FIG. 2B illustrates a block diagram of a typical cluster configuration with content-aware request distribution strategy with co-located distributor and server, and a centralized dispatcher in accordance with the prior art.
Figure 3:
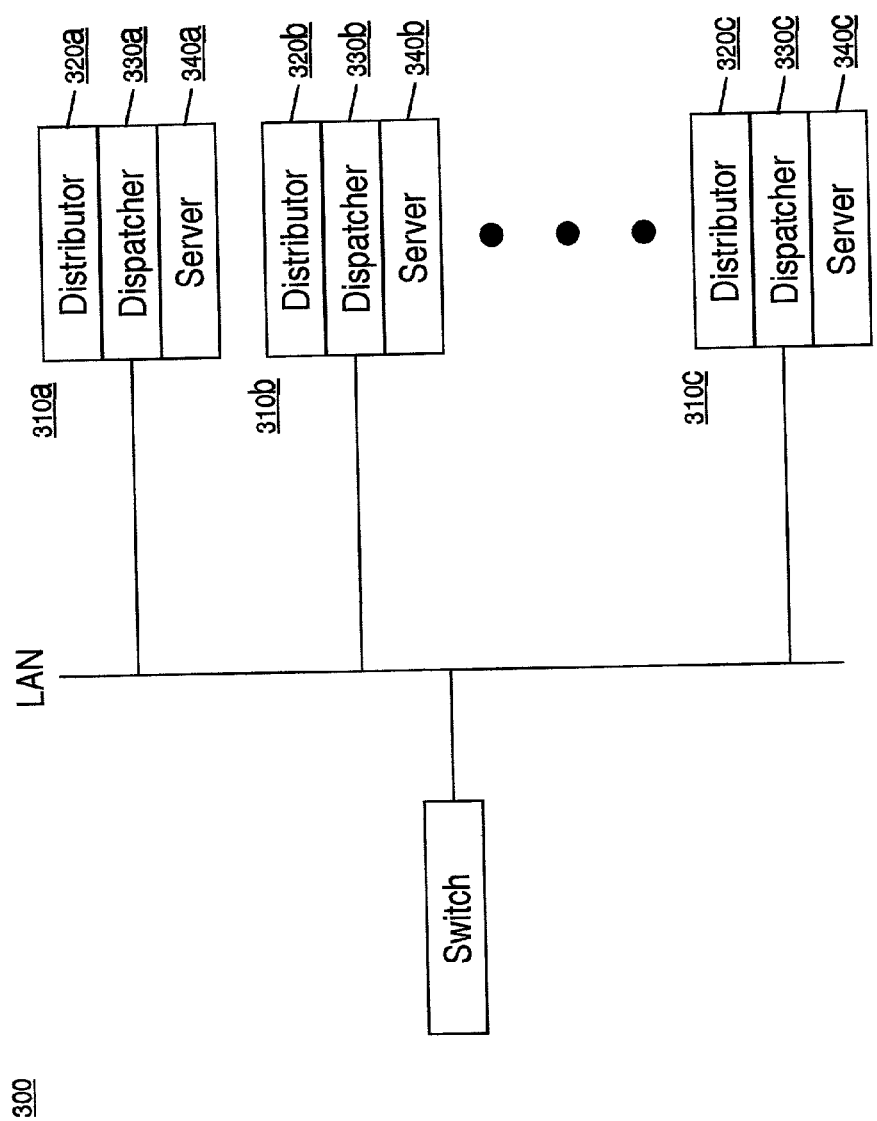
FIG. 3 illustrates a block diagram of a scalable web cluster configuration with workload-aware request distribution strategy with co-located dispatcher, distributor and server, in accordance with an embodiment of the present invention.

FIG. 3 illustrates a block diagram of a scalable web cluster configuration 300 with workload-aware request distribution strategy in accordance with one embodiment of the present invention. In this configuration, the distributor components (e.g. distributors 320a, 320b and 320c) and dispatcher components (e.g. dispatcher 330a, 330b and 330c) are co-located with the server components (e.g. server 340a, 340b and 340c) of each node (e.g. node 310a, 310b and 310c). It should be appreciated that cluster configuration can apply to any number of nodes in a cluster, and is not limited to the three nodes illustrated in FIG. 3. In one embodiment, the nodes are coupled to a network.

In one embodiment, the present scalable web cluster design implements a workload-aware request distribution (WARD) load balancing strategy in which a content-aware distribution is performed by each of the nodes in a web cluster. The current architecture is fully distributed. Each node in a cluster performs three different functions:
  the dispatcher, which implements the request distribution strategy, it decides which web server will be processing a given request;
  the distributor, which interfaces with the client and implements the TCP-handoff mechanism that distributes the client requests to specific web server; and
  the web server, which processes the requests.

In the present embodiment, the dispatcher component, which is replicated across all the cluster nodes, has the same routing information in all the nodes. The routing information indicates which node of the cluster is for processing which requested file. This routing information is defined by the off-line workload analysis process and a workload-aware distribution strategy (WARD). The distributor component of each node distributes a request to a specific node in the cluster. The server component of each node processes the request.

In the present embodiment, each node, after receiving a request, reviews the local dispatcher component routing table. The node then either accepts the request for local processing by the server component or forwards the request to the server component of another node for remote processing.

The present invention takes into account workload access patterns and cluster parameters such as number of nodes in a cluster, node RAM size, TCP handoff overhead, and disk access overhead. The present invention utilizes more efficiently the overall cluster RAM leading to improved web server cluster performance. The distribution (routing) strategy WARD is defined by off-line analysis of the joint set of all web server cluster logs during a certain time interval (e.g., daily analysis). The off-line analysis logically splits all the files into the following three groups:

$Files_{core}$,—a small set of most frequently accessed files, called core, the requests to which are processed locally, by any server in a cluster, $Files_{part}$,—the requests to which are partitioned to be served by different cluster nodes.

$Files_{on\ disk}$—the requests to which are processed locally, by any server in a cluster.

Figure 4:
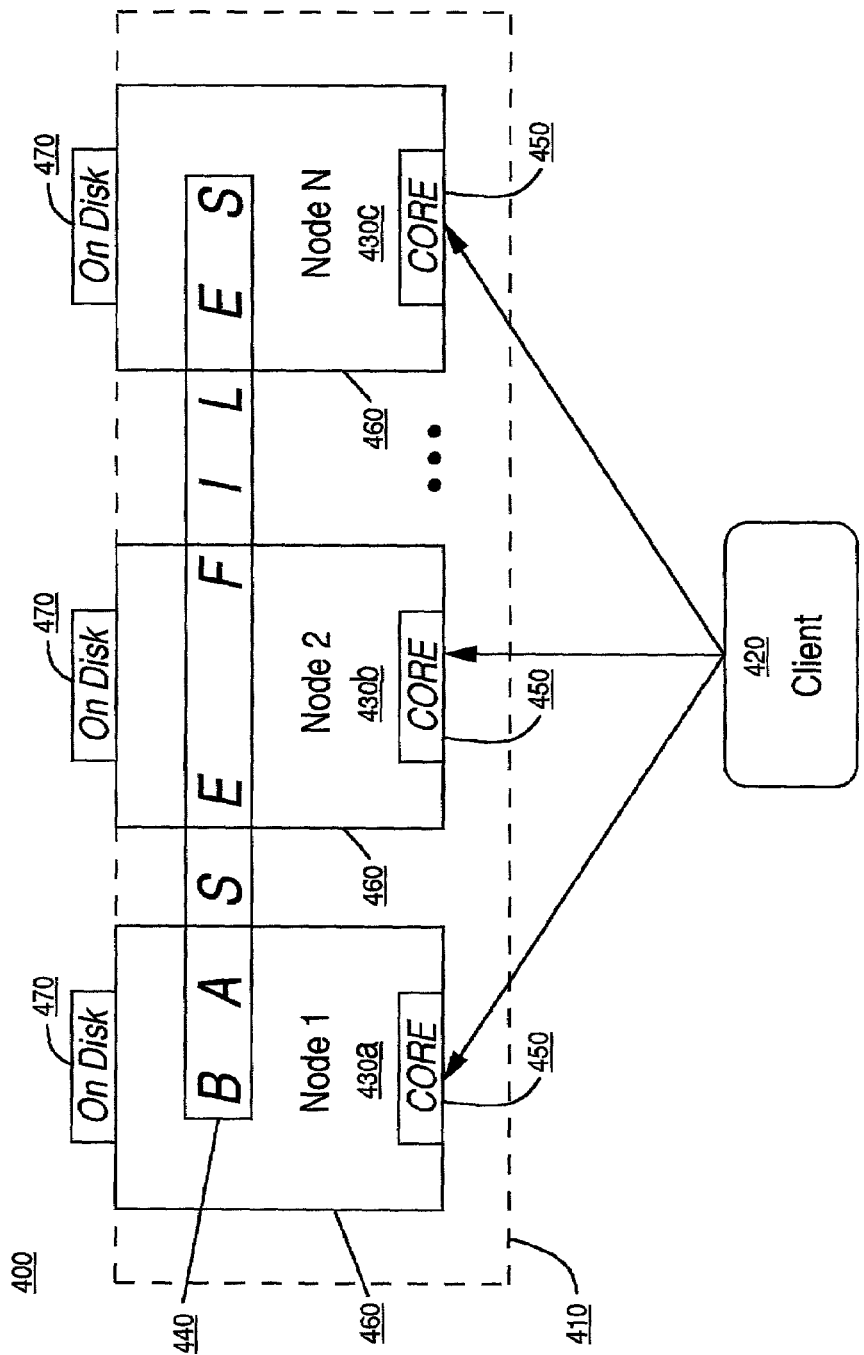
FIG. 4 illustrates a block diagram of the logically partitioned memory unit of a web server cluster implementing a workload-aware request distribution strategy in accordance with an embodiment of the present invention.

FIG. 4 illustrates a block diagram of the partitioned memory unit 410 of a web server cluster 400 implementing a workload-aware request distribution strategy in accordance with one embodiment of the present invention. In one embodiment, memory unit 410 is the cluster RAM (e.g., the combined RAM of all nodes of the cluster). Memory unit 410 comprises a number of partitioned memory units or "nodes" (e.g., nodes 430a, 430b, and 430c). It should be appreciated that memory unit 410 may comprise any number of nodes. It should be further appreciated that each node can reside on an independent computer system, and is not limited to the case of a partitioned memory unit.

In one embodiment, base files 440 are the set of files that fit into the cluster RAM (e.g., memory unit 410). In the present embodiment, base files 440 comprise web files for use in permitting a remote client 420 to access the files over the Internet. Disk 470 is a remote location distinct from the cluster RAM, wherein files evicted from the cluster RAM are stored on disk 470.

Under the strategy presented in the present invention, the base files 440 are represented by the three groups of files: $Files_{core}$ and $Files_{part}$ in the ClusterRAM (e.g., memory unit 410), and $Files_{on\ disk}$ consisting of files evicted from RAM to disk (e.g., disk 470) due to the expansion of the $Files_{core}$. Each node comprises a core section 450 and a partitioned section 460 for storing $Files_{core}$ and $Files_{part}$, respectively.

Web server performance greatly depends on efficient memory usage. The throughput of a web server is higher when it reads pages from a cache in memory than from disk. If all files of the web site fit in memory the web server demonstrates excellent performance because only the first request for a file will require a disk access, and all the following file accesses will be served from memory. The present invention provides a method and system for achieving the goals of maximizing the number of requests served from the total cluster memory by partitioning files to be served by different servers and minimizing the forwarding overhead by identifying the subset of core files to be processed on any node, (e.g., allowing the replication of these files in the memories across the nodes).

It is appreciated that processing the requests to the core files locally by each cluster node helps to minimize the forwarding overhead. However, it may result in additional, initial disk accesses to core files on all those nodes and extra disk accesses because more files will reside on disk due to the expansion of the core files. This is why the ultimate goal here is to identify such a subset of core files for which the forwarding overhead savings are higher than the additional cost of the disk accesses caused by the core files.

Figure 5:
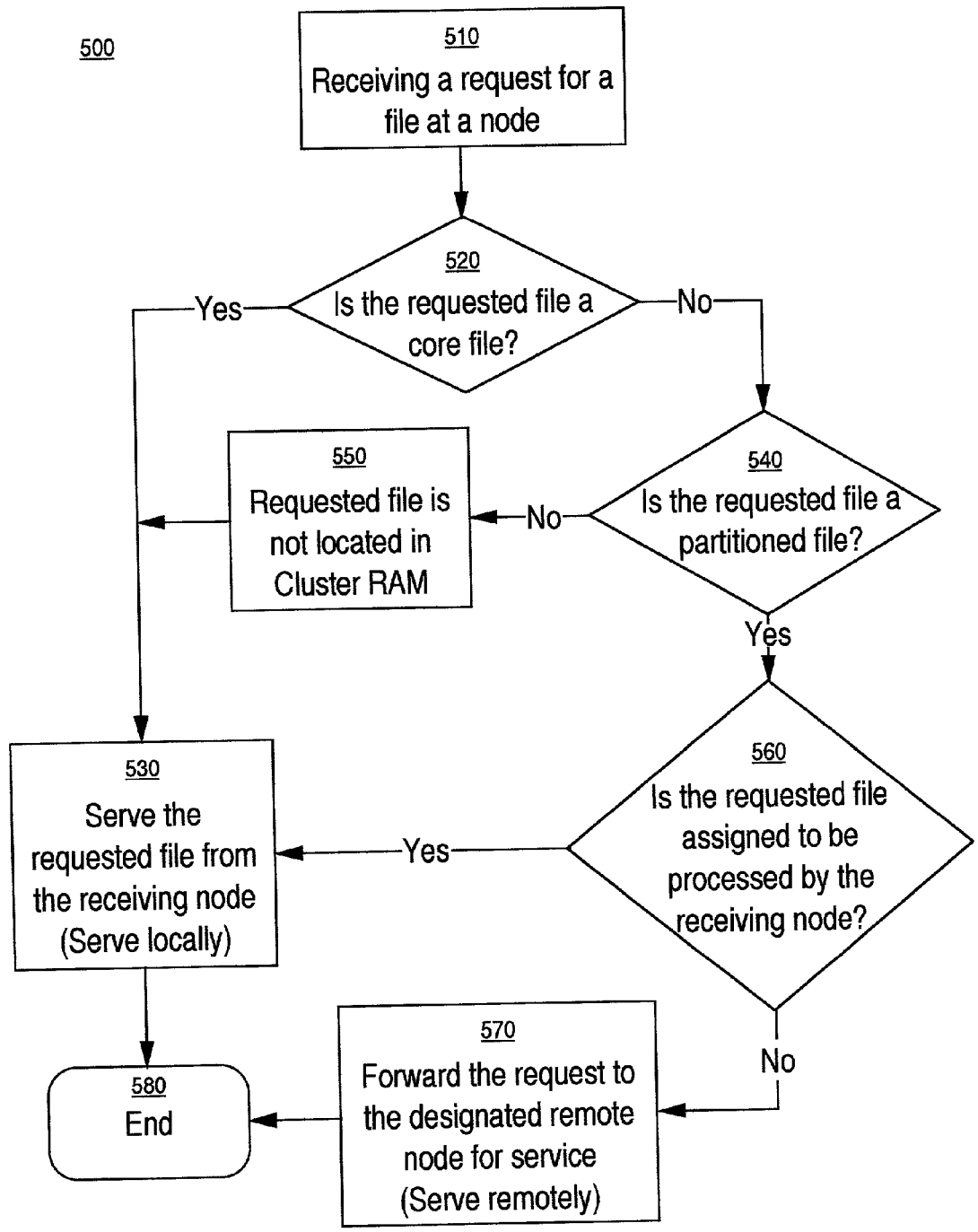
FIG. 5 is a flowchart diagram illustrating steps in a process of workload-aware request distribution in cluster-based network servers in accordance with an embodiment of the present invention.

FIG. 5 is a flowchart diagram illustrating steps in a process 500 of workload-aware request distribution in cluster-based network servers in accordance with one embodiment of the present invention.

At step 510 of process 500, a request for a file is received at a node of the web server cluster. In one embodiment, the request is an HTTP request sent by a remote client. Each node comprises a dispatcher component, a distributor component, and a server component (see scalable web cluster configuration 300 of FIG. 3, infra).

At step 520, it is determined whether the requested file is a core file (e.g., a frequently accessed file assigned to be served by any node). In one embodiment, the dispatcher component reviews the routing information to determine whether the requested file is a core file.

If it is determined that the requested file is a core file, as shown at step 530, the server component of the receiving node processes the requested file.

If it is determined that the requested file is not a core file, as shown at step 540, it is then determined whether the requested file is a partitioned file (e.g., a file assigned to be served by a particular node in a cluster). In one embodiment, the dispatcher component reviews the routing information to determine whether the requested file is a partitioned file.

If the requested file is not a partitioned file, as shown at step 550, the requested file is served locally from the receiving node.

If the requested file is a partitioned file, as shown at step 560, it is determined whether the requested file is assigned to be processed by the receiving node. If it is determined that the requested file assigned to be processed by the receiving node, as shown at step 530, the requested file is served locally from the receiving node. In one embodiment, the server component processes the requested file.

If it is determined that the requested file is not assigned to be processed by the receiving node, as shown at step 570, the distributor component forwards the request to the remote node designated by the dispatcher component. In one embodiment, the request is processed at the remote node by the server component of the remote node.

At step 580, process 500 ends. Process 500 is repeated for every request received by the cluster.

Figure 6:
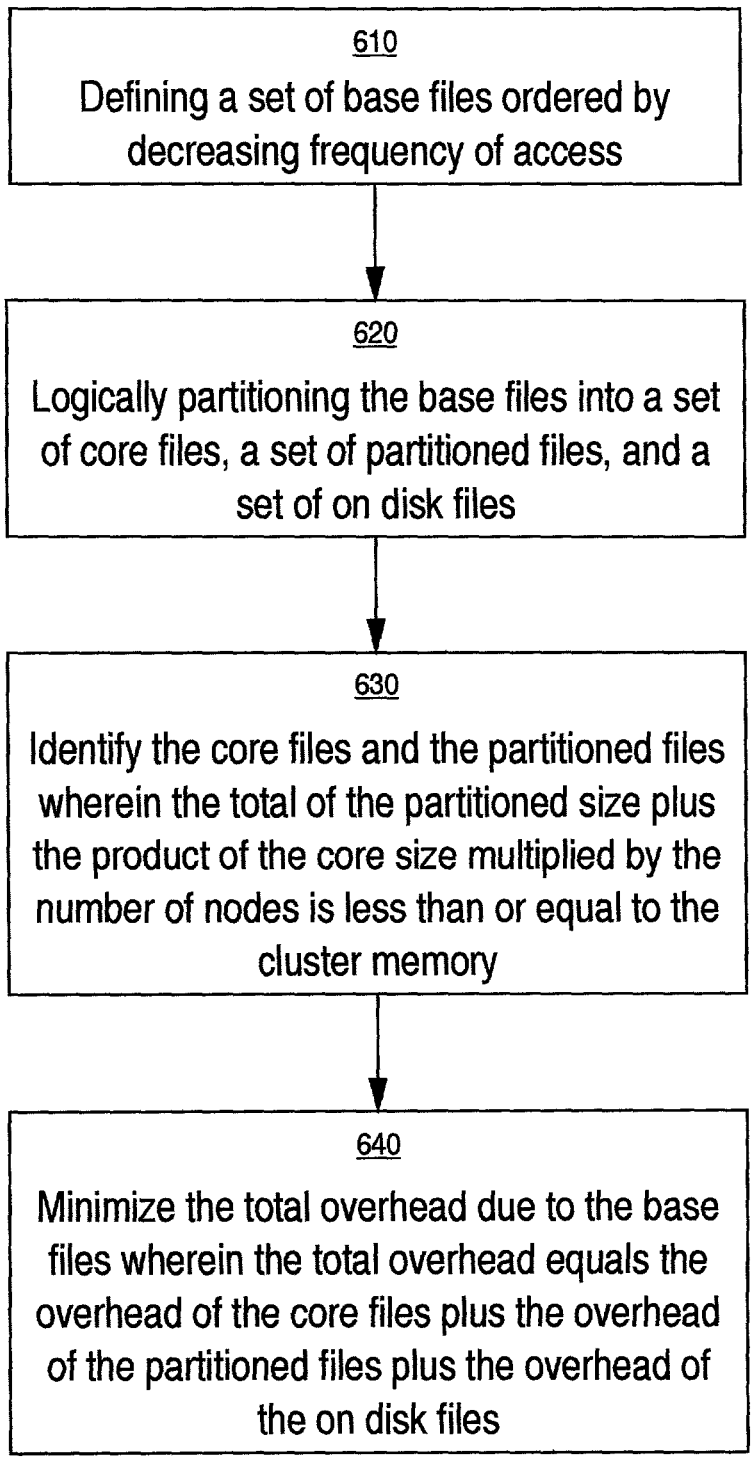
FIG. 6 is a flowchart diagram illustrating steps in a process of identifying a set of core files that minimizes the overhead due to the base files in accordance with an embodiment of the present invention.

FIG. 6 is a flowchart diagram illustrating steps in a process 600 of identifying a set of core files and partitioned files that minimizes the overhead due to the base files in accordance with one embodiment of the present invention.

At step 610 of process 600, a set of base files is defined. The base files are a set of frequently accessed files fitting into the cluster memory (RAM) of a web server cluster. In one embodiment, the cluster memory is RAM. In one embodiment, the base files are ordered by decreasing frequency of access.

At step 620, the base files are logically partitioned into a set of core files having a core size, a set of partitioned files having a partitioned size, and a set of on disk files. In one embodiment, the base files comprising each set of files are ordered by decreasing frequency of access.

At step 630, the files comprising the core files and the partitioned files are identified, wherein the total of the partitioned size added to the product of the number of nodes multiplied by the core size is less than or equal to the cluster memory.

In one embodiment, the frequencies of access (the number of times a file was accessed) and sizes of individual files is used to determine the core set of files. These are denoted by FileFreq and FileSize, respectively. These are gathered by analyzing web-server access logs from the cluster. Freq-Size is the table of all accessed files with their frequency and the files sizes. This table is sorted in decreasing frequency order. The determination of the contents of the core files assumes that the cache replacement policy of the file cache in the web-server has the property that the most frequent files will most likely be in the ClusterRAM, wherein ClusterRAM is defined as the total size of all the file caches in the cluster.

If all the files were partitioned across the cluster nodes, the most probable files to be in the cluster RAM would be the most frequent files that fit into the cluster RAM. The set of files that fit into the cluster RAM is called BaseFiles (e.g., base files 440 of FIG. 4). The maximum number of the BaseFiles are stored in the ClusterRAM (e.g., memory unit 410 of FIG. 4 or cluster RAM), at a price that $$\frac{N-1}{N}$$

of the request coming to each node of the total N nodes have to be handed off. Under the present invention, BaseFiles are represented by three groups of files as shown in Equation 1: $Files_{core}$ and $Files_{part}$ in the ClusterRAM, and $Files_{on\ disk}$ consisting of BaseFiles that do not fit into ClusterRAM due to the expansion of $Files_{core}$. They satisfy Equations 1 and 2:

$$BaseFiles = Files_{part} + Files_{core} + Files_{on\ disk} \quad \text{Equation 1}$$

Wherein:

$Files_{core}$ are the files belonging to the core, the requests to these files are served locally by any node, and having a size $Size_{core}$, the combined size (in bytes) of the files in $Files_{core}$;

$Files_{part}$ are files belonging to the partition, the requests to these files are served by a particular prescribed node (i.e. they are forwarded using TCP handoff to be processed by a particular node in a cluster), and having a size $Size_{part}$, the combined size (in bytes) of the files in $Files_{part}$; and $Files_{on\ disk}$ are files belonging to neither the core nor the partition, the requests to these files are served locally by any node (e.g., these are the files which most likely to reside on disk).

$$N \cdot Size_{core} + Size_{part} \leq ClusterRAM \quad \text{Equation 2}$$

The ideal case for web server request processing is when a request is processed locally (e.g., it does not incur an additional forwarding overhead (ForwardOH)) and it is processed from the node RAM (e.g., it does not incur an additional disk access overhead (DiskOH)). The goal is to identify a set of $Files_{core}$ and a set of $Files_{part}$ that minimizes the total overhead due to BaseFiles:

$$OH_{BaseFiles} = OH_{core} + OH_{part} + OH_{on\ disk}. \quad \text{Equation 3}$$

Wherein:

$OH_{BaseFiles}$ is the total overhead due to BaseFiles;
$OH_{core}$ is the overhead due to $Files_{core}$;
$OH_{part}$ is the overhead due to $Files_{part}$; and
$OH_{on\ disk}$ is the overhead due to $Files_{on\ disk}$.

Still with reference to FIG. 6, at step 640, the total overhead due to the base files is minimized wherein the total overhead equals an overhead of the core files plus an overhead of the partitioned files plus an overhead of the on disk files.

First, analyze what the additional overhead incurred by processing the requests to $Files_{part}$ is, denoted as $OH_{part}$. Assuming all these files are partitioned to be served by different nodes, statistically a file in the partition incurs forwarding overhead on the average $$\frac{N-1}{N}$$

times, where N is the number of nodes in the cluster. The file from partition will also incur one disk access on the node it is assigned to the first time it is read from disk. This reasoning gives the following overhead for the partition files:

$$Penalty_{forward} = \frac{N-1}{N} \cdot FileFreq \cdot ForwardOH \quad \text{Equation 4}$$

$$Penalty_{DiskAccess} = FileSize \cdot DiskOH \quad \text{Equation 5}$$

$$OH_{part} = \sum_{Files_{part}} Penalty_{forward} + Penalty_{DiskAccess} \quad \text{Equation 6}$$

where ForwardOH is the processing time in μsec the TCP handoff operation consumes, and DiskOH is the extra time in μsec it generally takes to read one byte from disk compared to from RAM.

Determine the additional overhead incurred by processing the requests to $Files_{core}$. If a file belongs to the core then the request to such file can be processed locally, (e.g., with no additional forwarding overhead for these files). The drawback is that the files have to be read from disk into memory once on all the nodes in the cluster and that the number of files in $Files_{on\ disk}$ increases due to the expansion of $Files_{core}$, creating additional disk access overhead. However, this is under the assumption that the files are accessed frequently enough that at least one request for each file will end up on all nodes. For files that are accessed less frequently this number is expected to be lower, thus it is necessary to calculate the expected value of the number of nodes that get at least one access to a file given a certain frequency f and a number of nodes N.

$$E(f) = \sum_{i=1}^{N} i \cdot P(f, i) \quad \text{Equation 7}$$

Here P(f,i) is the probability that exactly i nodes will have the file after f references to it. It can be calculated using the following recursion and starting conditions.

$$P(f+1, i) = P(f, i-1) \cdot \frac{N-(i-1)}{N} + P(f, i) \cdot \frac{i}{N} \quad \text{Equation 8}$$

$$P(0, 0) = 1$$

$$P(0, 1) = P(0, 2) = \ldots = P(0, N) = 0$$

$$P(1, 0) = P(2, 0) = \ldots = P(\infty, 0) = 0$$

The overhead due to extra disk accesses to core files, denoted as $OH_{core}$, can then be calculated as follows.

$$OH_{core} = \sum_{Files_{core}} E(FileFreq, N) \cdot DiskOH \cdot FileSize \quad \text{Equation 9}$$

Finally, the requests to $Files_{on\ disk}$ will incur additional disk overhead every time these files are accessed, which gives the following equation.

$$OH_{on\ disk} = \sum_{Files_{on\ disk}} FileFreq \cdot DiskOH \cdot FileSize \quad \text{Equation 10}$$

Using the reasoning and the equations above, a set $Files_{core}$ that minimizes the total overhead due to BaseFiles can be computed.

Figure 7:
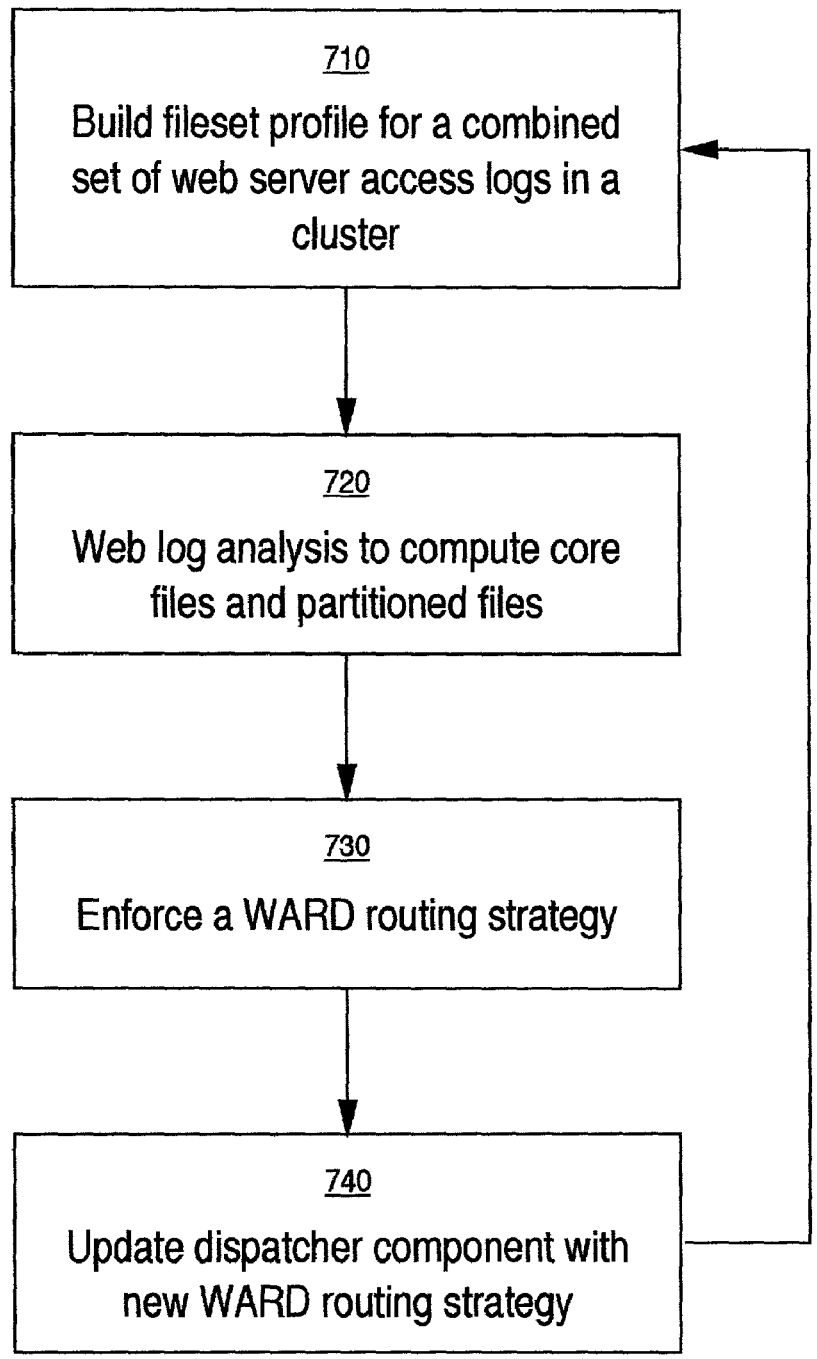
FIG. 7 is a flowchart diagram of an overall workload-aware request distribution strategy for use in a web server cluster in accordance with an embodiment of the present invention.

FIG. 7 is a flowchart diagram of an overall workload-aware request distribution strategy for use in a web server cluster in accordance with an embodiment of the present invention.

At step 710 of process 700, for a combined set of web server access logs in a cluster, a fileset profile is built for a combined set of web server access logs. In one embodiment, the table of all accessed files with their file frequency (number of times a file was accessed during the observed period) and their file size is built. This table is sorted in decreasing file frequency order.

At step 720 a WARD mapping is built. Using process 600 of FIG. 6, the $Files_{core}$ and $Files_{part}$ are computed. All files that do not belong to $Files_{core}$ or $Files_{part}$ are denoted as $Files_{on\ disk}$. $Files_{part}$ are further partitioned among the N nodes in the cluster in some balanced manner (e.g., according to a round-robin policy) such that the request to a file from $Files_{part}$ is going to be processed by a particular node in the cluster.

At step 730, once the WARD mapping is built, the dispatcher component in each cluster node will enforce the following WARD routing strategy.

| | |
|---|---|
| If in core: | serve locally |
| If in partition and local: | serve locally |
| If in partition and remote: | send to designated remote node |
| Everything else: | serve locally |

At step 740, the distributor component in the each cluster node will send the request to be processed either locally or forward it to a corresponding node in the cluster, accordingly to directions of its corresponding dispatcher component.

By monitoring the traffic to a web cluster and analyzing it (for example, on a daily basis), WARD proposes a new balancing schema where the files (and requests to them) are classified into three groups: $Files_{core}$, $Files_{part}$ and $Files_{on\ disk}$.

The preferred embodiment of the present invention, a method and system for workload-aware request in cluster-based network servers, is thus described. While the present invention has been described in particular embodiments, it should be appreciated that the present invention should not be construed as limited by such embodiments, but rather construed according to the below claims.

What is claimed is:

1. A server cluster having a plurality of nodes, the server cluster comprising:
    a set of base files, wherein said base files are a set of frequently accessed files fitting into a cluster memory of said server cluster, and wherein the base files are logically partitioned into a set of core files having a core size, a set of partitioned files having a partitioned size, and a set of on disk files, and wherein a total of the partitioned size added to the product of the number of said plurality of nodes multiplied by the core size is no greater than the cluster memory; and wherein each node of said plurality of nodes comprises:
    at least said set of core files stored locally thereto;
    a distributor component for distributing a request to a specific node of said plurality of nodes;
    a dispatcher component comprising routing information for said plurality of nodes and replicated across said plurality of nodes, wherein said routing information indicates which said node of said plurality of nodes is for processing said request, said dispatcher component coupled to said distributor component; and
    a server component for processing said request, said server component coupled to said dispatcher component;
    wherein said plurality of nodes are coupled to a network.

2. The server cluster as recited in claim 1 wherein said server cluster is a web server cluster.

3. The server cluster as recited in claim 1 wherein said cluster memory is a combined random access memory of each of said nodes of said server cluster.

4. The server cluster as recited in claim 1 wherein each of said plurality of nodes further comprises a set of partitioned files.

5. The server cluster as recited in claim 1 wherein said set of core files comprises a set of most frequently accessed files of said set of bases files.

6. A server cluster having a plurality of nodes, wherein each node of said plurality of nodes comprises:
    a distributor component for distributing a request to a specific node of said plurality of nodes;
    a dispatcher component comprising routing information for said plurality of nodes and replicated across said plurality of nodes, wherein said routing information indicates which said node of said plurality of nodes is for processing said request, said dispatcher component coupled to said distributor component;
    a server component for processing said request, said server component coupled to said dispatcher component;
    wherein said plurality of nodes are coupled to a network, and wherein each of said plurality of nodes further comprises a set of core files and a set of partitioned files; and
    wherein said set of core files is identified by the steps of:
    a) logically partitioning said base files into a first subset of files having a first size, a second subset of files having a second size, and a third subset of files having a third size, wherein said base files comprising each of said first subset of files, said second subset of files, and said third subset of files are ordered in decreasing frequency of access;

b) identifying said first subset of files and said second subset of files wherein the total of said second size added to the product of said number of nodes multiplied by said first is less than said cluster memory; and c) minimizing a total overhead due to the base files wherein said total overhead equals an overhead of said first subset of files plus an overhead of said second subset of files plus said overhead of said third subset of files.

7. A method for managing request distribution to a set of files stored on a server, said method comprising the steps of:

a) receiving a request for a file at a first node of a plurality of nodes, each of said nodes comprising a distributor component for distributing a request to a specific node of said plurality of nodes, a dispatcher component comprising routing information for said plurality of nodes and replicated across said plurality of nodes, and a server component for processing said request;

b) provided said request is for a core file, processing said request at said first node;

c) provided said request is for a partitioned file, determining whether said request is assigned to be processed by said first node;

c1) provided said request is for a partitioned file assigned to be processed by said first node, processing said request at said first node;

c2) provided said request is for a partitioned file assigned to be processed by another node of said plurality of nodes, forwarding said request to a specific node of said plurality of nodes as indicated by said dispatcher component of said first node and processing said request at said specific node; and d) provided said request is not for a said core file or a said partitioned file, processing said request at said first node;

wherein each of said plurality of nodes further comprises a set of core files comprising said core file and a set of partitioned files comprising said partitioned file, and wherein said set of core files is identified by the steps of:

a) logically partitioning said base files into said set of core files having a core size, said set of partitioned files having a partitioned size, and a set of on disk files having an on disk size, wherein said base files comprising each of said set of core files, said set of partitioned files, and said set of on disk files are ordered in decreasing frequency of access;

b) identifying said set of core files and said set of partitioned files wherein the total of said partitioned size added to the product of number of said plurality of nodes multiplied by said core size is less than memory of said plurality of nodes; and c) minimizing a total overhead due to the base files wherein said total overhead equals an overhead of said core set of files plus an overhead of said partitioned set of files plus said overhead of said on disk set of files.

8. A method for identifying a set of frequently accessed files on a server cluster comprising a number of nodes, said method comprising the steps of:

a) defining a set of base files, wherein said base files are a set of frequently accessed files fitting into the cluster memory of said server cluster, said base files ordered in decreasing frequency of access;

b) logically partitioning said base files into a first subset of files having a first size, a second subset of files having a second size, and a third subset of files having a third size, wherein said base files comprising each of said first subset of files, said second subset of files, and said third subset of files are ordered in decreasing frequency of access;

c) identifying said first subset of files and said second subset of files wherein the total of said second size added to the product of said number of nodes multiplied by said first size is not greater than said cluster memory; and d) minimizing a total overhead due to the base files wherein said total overhead equals an overhead of said first subset of files plus an overhead of said second subset of files plus said overhead of said third subset of files.

9. The method as recited in claim 8 wherein said server cluster is a web server cluster.

10. The method as recited in claim 8 wherein said cluster memory is a combined random access memory of each of said nodes of said web server cluster.

11. The method as recited in claim 8 wherein said first subset of files is a set of core files and wherein said first size is a core size.

12. The method as recited in claim 8 wherein said second subset of files is a set of partitioned files and wherein said second size is a partitioned size.

13. A method for determining a set of $Files_{core}$, said method comprising the steps of:

a) defining a set of BaseFiles as a set of frequently accessed files fitting into a ClusterRAM, said BaseFiles ordered in decreasing frequency of access;

b) logically partitioning said BaseFiles into a $Files_{part}$, a $Files_{core}$ and a $Files_{on\ disk}$ wherein $BaseFiles = Files_{part} + Files_{core} + Files_{on\ disk}$;

c) identifying said set $Files_{part}$ and said set $Files_{core}$ according to $N \infty Size_{core} + Size_{part} \leq ClusterRAM$; and d) minimizing $OH_{BaseFiles}$ according to $OH_{BaseFiles} = OH_{part} + OH_{core} + OH_{on\ disk}$.

14. The server cluster as recited in claim 1 wherein each file of said set of partitioned files is assigned to a particular one of said plurality of nodes for processing thereof.

15. The server cluster as recited in claim 14 wherein said routing information indicates which of said plurality of nodes is assigned for processing each of said set of partitioned files.

16. The server cluster as recited in claim 1 wherein said dispatcher component of a node that receives said request ("the receiving node") comprises logic for determining whether said request is a request to access a core file, and if determined that said request is a request to access said core file then said dispatcher component of the receiving node assigns the server component of the receiving node to process said request.

17. The server cluster as recited in claim 16 wherein said dispatcher component of the receiving node further comprises logic for determining whether said request is a request to access a partitioned file, and if determined that said request is a request to access said partitioned file then said dispatcher component of the receiving node determines one of said plurality of node assigned to process the requested partitioned file.

18. The server cluster as recited in claim 17 wherein if said dispatcher component determines that the receiving node is assigned to process the requested partitioned file, the dispatcher component assigns the server component of the receiving node to process said request.

* * * * *

UNITED STATES PATENT AND TRADEMARK OFFICE
CERTIFICATE OF CORRECTION

| | | |
|---|---|---|
| PATENT NO. | : 7,117,242 B2 | |
| APPLICATION NO. | : 09/886672 | |
| DATED | : October 3, 2006 | |
| INVENTOR(S) | : Ludmila Cherkasova et al. | |

It is certified that error appears in the above-identified patent and that said Letters Patent is hereby corrected as shown below:

In column 13, line 66, in Claim 8, delete "defininga" and insert -- defining a --, therefor.

In column 14, line 43, in Claim 13, delete "$N \infty Size_{core}$" and insert -- $N \bullet Size_{core}$ --, therefor.

Signed and Sealed this

Third Day of February, 2009

JOHN DOLL
*Acting Director of the United States Patent and Trademark Office*